Dec. 29, 1925.
1,567,029
C. BORGMANN
TELEPHONE SWITCHBOARD
Filed May 1, 1924
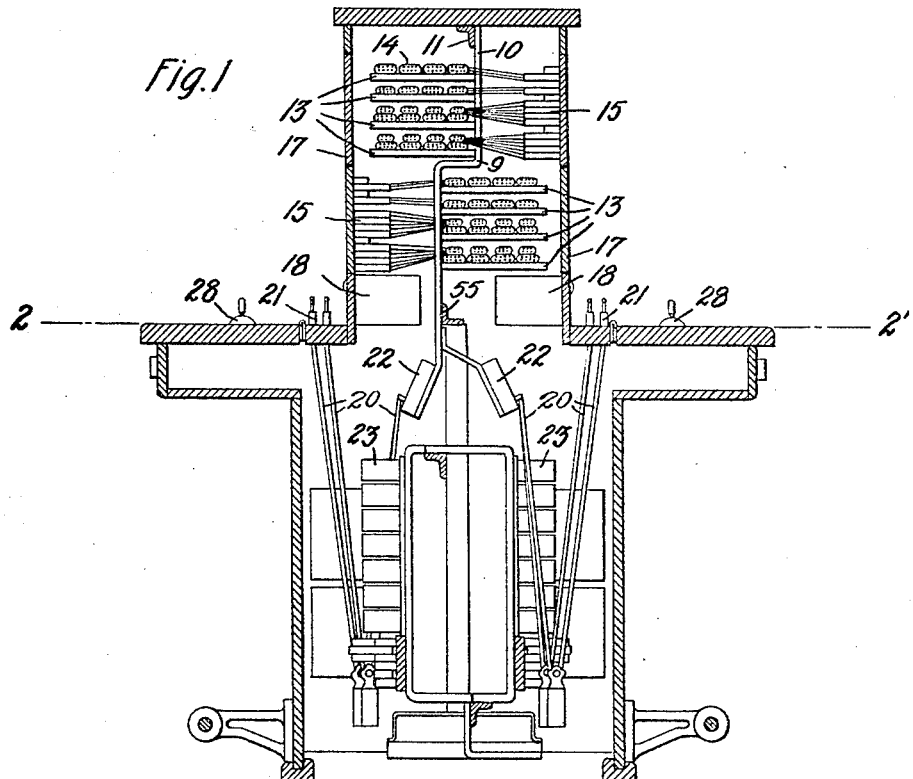
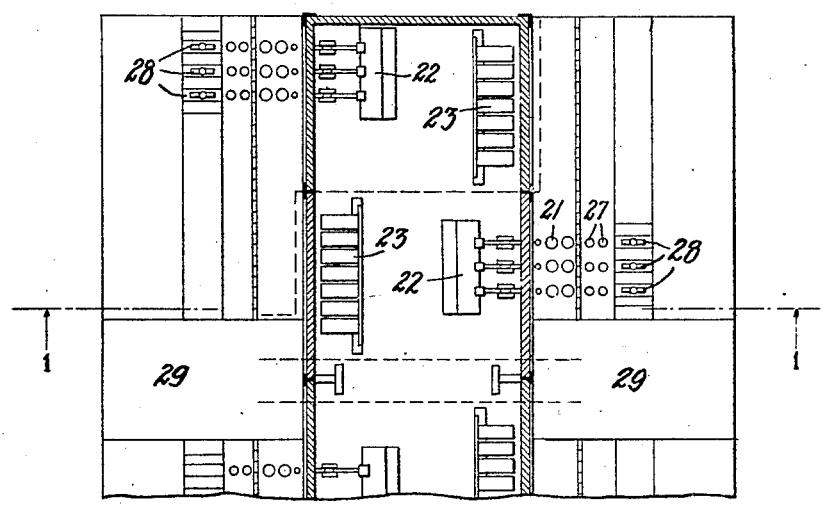
Inventor:
Charles Borgmann
by E. W. Adams, Atty Patented Dec. 29, 1925.

1,567,029

UNITED STATES PATENT OFFICE.

CHARLES BORGMANN, OF GREAT NECK, NEW YORK, ASSIGNOR TO WESTERN ELECTRIC COMPANY, INCORPORATED, OF NEW YORK, N. Y., A CORPORATION OF NEW YORK.

TELEPHONE SWITCHBOARD.

Application filed May 1, 1924. Serial No. 710,473.

*To all whom it may concern:*

Be it known that I, CHARLES BORGMANN, a citizen of the United States of America, residing at Great Neck, in the county of Nassau, State of New York, have invented certain new and useful Improvements in Telephone Switchboards, of which the following is a full, clear, concise, and exact description.

This invention relates to improvements in telephone switchboards and more particularly to the construction and arrangement of such switchboards and their associated apparatus.

An object of this invention is to provide a switchboard whereby the floor space may be economized in accordance with the number of operators' positions or, in other words, to provide a switchboard which is of approximately the same dimensions as the present single sided switchboards in use but capable of accommodating twice as many operators and having double the capacity.

Another object of this invention is to arrange the apparatus and devices disposed in the switchboard so that they may be readily reached for inspection and repair.

One of the features of this invention resides in providing a double-sided switchboard section having the positional equipment of oppositely situated operators located adjacent to each other in the space between the opposite operators' positions.

Another feature resides in a double-faced switchboard section provided with oppositely disposed adjustable cable supports, the arrangement being such that cables corresponding to the jack capacity of one face of the switchboard may be fed out to either face of the switchboard.

The nature of this invention will more fully appear from the following specification and annexed drawing.

Referring to the drawing, Fig. 1 is a sectional view on the line 1, 1' of Fig. 2 and Fig. 2 is a plan view on the line 2, 2' of Fig. 1 showing the disposition of the apparatus in the lower portion of the switchboard.

In Fig. 1 the cable pin supports 10 have a double right angle bend 9 so that the upper and lower portions thereof are out of alignment a substantial amount. The supports are fastened at the top and bottom to the framework of the switchboard by brackets 11 and 55.

Screw threaded openings are provided at frequent intervals in the supports 10 into which are screwed pins 13 for supporting the switchboard cables 14.

In the opposite faces of the switchboard are mounted the usual jacks and lamps 15, those in the right hand side, for example, being mounted in the upper half of that face and fed from the cables 14 above the bend 9 while those on the other or left hand side are mounted in the lower half of that face and fed from the cables mounted below the bend 9.

Removable panels 17 are fitted in the lower half of the right hand face and in the upper half of the left hand face of the switchboard thereby providing easy access to the cables feeding the opposite jacks and lamps.

Located at the bottom and on both sides of the upper portion of the switchboard are pigeon holes or ticket boxes 18. Cords 20 are suepended from cord shelves 22 in the lower portion of the switchboard, in both cases these cords being at the operator's left.

Fig. 2 illustrates more clearly the horizontally staggered arrangement of the apparatus in the lower portion of the switchboard which includes the keys 28, supervisory lamps 27, plugs 21, cords 20, cord shelves 22, relays 23, etc.

The spaces 29 between the adjacent operators' positions are provided for sending valves of a pneumatic distributing system.

It may be noted that the use of a double-sided switchboard of this type affords a substantial saving in floor space. It has been found that an operator can handle only a certain amount of traffic and cover only a limited section of a switchboard under normal traffic conditions. By the use of this double-sided type switchboard and by staggering the equipment as described, apparatus for enabling two operators to conveniently handle a maximum number of calls, may be installed in an area of floor space substantially equal to that formerly required for a one operator section of a single-sided board fitted to take care of a much smaller amount of traffic.

It will be further observed that the capacity of the jack field in the face of the switchboard may be easily varied by changing the cable supports and is only limited by the provision that the jack field on one side must not overlap that on the other side. It will be further observed that the relay equipment, etc. in the lower portion of the switchboard is so staggered that equipment for both operators' positions is easily located in substantially the same space as that of a single sided switchboard.

What is claimed is:

1. A double-sided switchboard comprising two oppositely situated operators' positions, said positions having substantially identical faces and desks, equipment for each of said positions being staggered with respect to the equipment of the other, said equipment being so disposed within the space between said positions that the wiring for the equipment of each of said positions is located adjacent to the equipment of the other position.

2. A double-sided switchboard comprising a mid-section, jacks, relays, and other equipment associated with and positioned in said switchboard, faces and desks of identical dimensions on the opposite sides of said mid-section for providing access to said jacks, and other equipment contained within said section, said equipment being so disposed within said section that the apparatus for one desk and the associated portion of the face corresponding thereto on one side of said switchboard forms a unit located adjacent to the corresponding unit required for the opposite side of said switchboard, all said apparatus being situated in the space limited by the width of said identically dimensioned and oppositely disposed desks, the apparatus for each of said sides facing in a direction opposite to the apparatus for the other side.

3. A double-sided switchboard having two identical sides oppositely situated with respect to each other, desks on each of said sides situated at a certain level above the base of said switchboard, a plurality of vertical columns of adjustable cable supports located in the space between the sides of said switchboard and above the level of said desks, said cable supports being so arranged that the cables corresponding to the jack capacity of one of said sides may be fed out to either of said sides, said cable supports being so arranged that the cables corresponding to the jack capacity of one of said sides are situated above and out of alinement with the cables corresponding to the jack capacity of the other of said sides, any of the wiring of said cables serving one side being easily accessible from the other of said sides.

4. A double-sided switchboard having two oppositely situated operators' positions, a desk on each of said sides projecting therefrom at a certain level above the base of said switchboard, equipment for each of said positions situated below the level of said desks and in the space between the sides of said switchboard, each piece of equipment for each of said positions being situated relative to the face of said position, similarly as its counterpart serving the oppositely situated position is situated relative to the face of said opposite position, the wiring of said equipment for each of said sides being easily accessible from the other of said sides.

In witness whereof, I hereunto subscribe my name this 29th day of April, A. D. 1924.

CHARLES BORGMANN.